Oct. 29, 1940.  K. H. KRAUSE  2,219,958
GRAIN DRILL TRANSMISSION
Filed Dec. 7, 1938  2 Sheets—Sheet 2

INVENTOR
KARL H. KRAUSE
BY A.S.Krob
ATTORNEY

Patented Oct. 29, 1940

2,219,958

UNITED STATES PATENT OFFICE 2,219,958

GRAIN DRILL TRANSMISSION

Karl H. Krause, York, Ontario, Canada, assignor to Massey-Harris Company Ltd., Toronto, Ontario, Canada, a corporation of Canada Application December 7, 1938, Serial No. 244,368

6 Claims. (Cl. 74—349)

The present invention is directed generally to an improved transmission for grain drills and the like and has for its object providing simple means for changing the speed of the grain feeding mechanism relative to the ground speed of the drill.

One of the objects of the present invention is to provide a change speed mechanism having a large number of changes but compact enough to be inclosed within a relatively small grease tight gear housing.

A further object of the present invention is to provide convenient means for gear shifting having means whereby the operator may, at a glance, determine the exact speed ratio at which the gears are set.

The principal objects of the present invention, generally stated, are to provide a transmission of the class which is simple, efficient, light, inclosed and easily understood and wherein the device may be manufactured at low cost.

To these and other useful ends, my invention consists of parts, combinations of parts, or their equivalents, and mode of operation, as hereinafter set forth and claimed and shown in the accompanying drawings in which:

Figure 1:
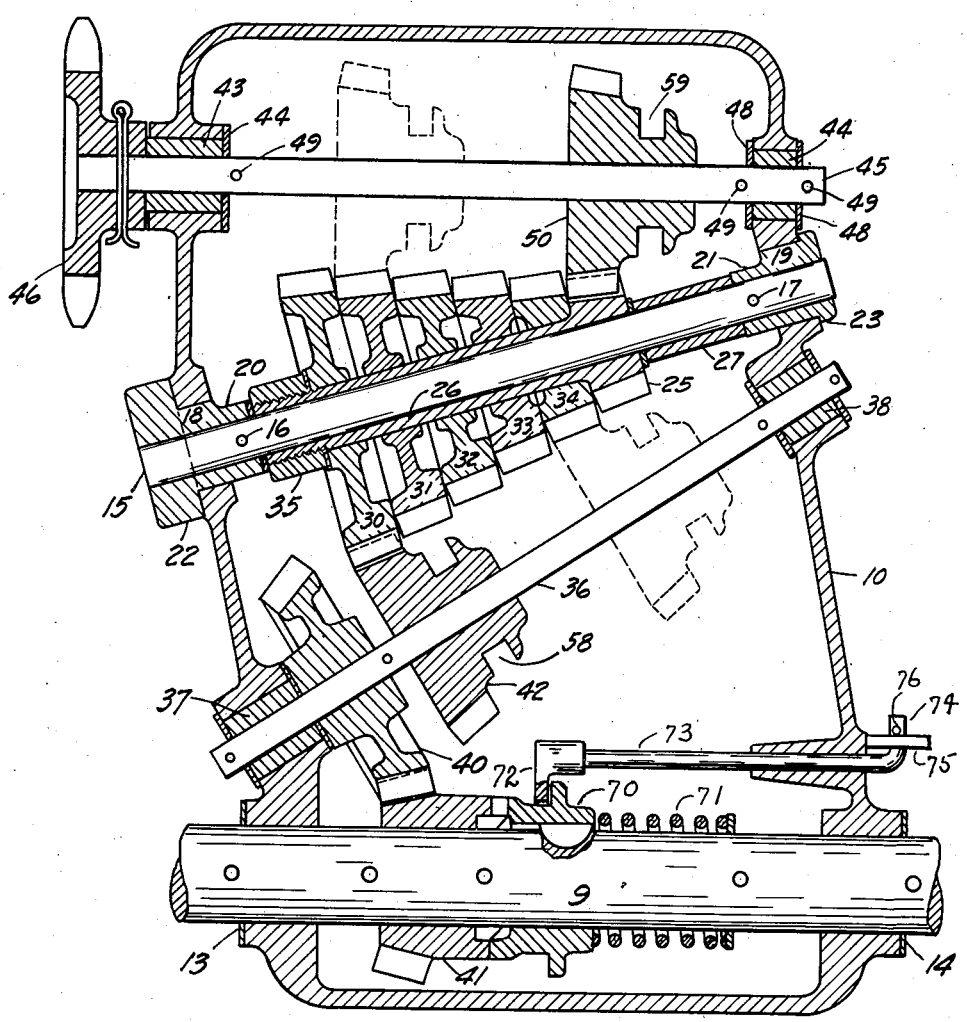
Fig. 1 is a top view of the mechanism, a portion of the housing being removed on line 1—1 of Figure 2.

As thus illustrated, the housing of my device is designated by reference numeral 10 having a lid 11 which is removably secured to the housing by means of bolts 12. The main axle or counter shaft 9 of the grain drill is journaled in one side of the housing on opposite ends thereof as at 13 and 14.

I provide what I term a cone gear supporting shaft 15 in the position clearly illustrated in Figure 1 and being rotatably mounted in the housing by means of eccentric bearing sleeves 18 and 19 each having preferably inwardly extending lugs 20 and 21 whereby pins may be inserted through these lugs and the shaft as at 16 and 17.

Figure 2:
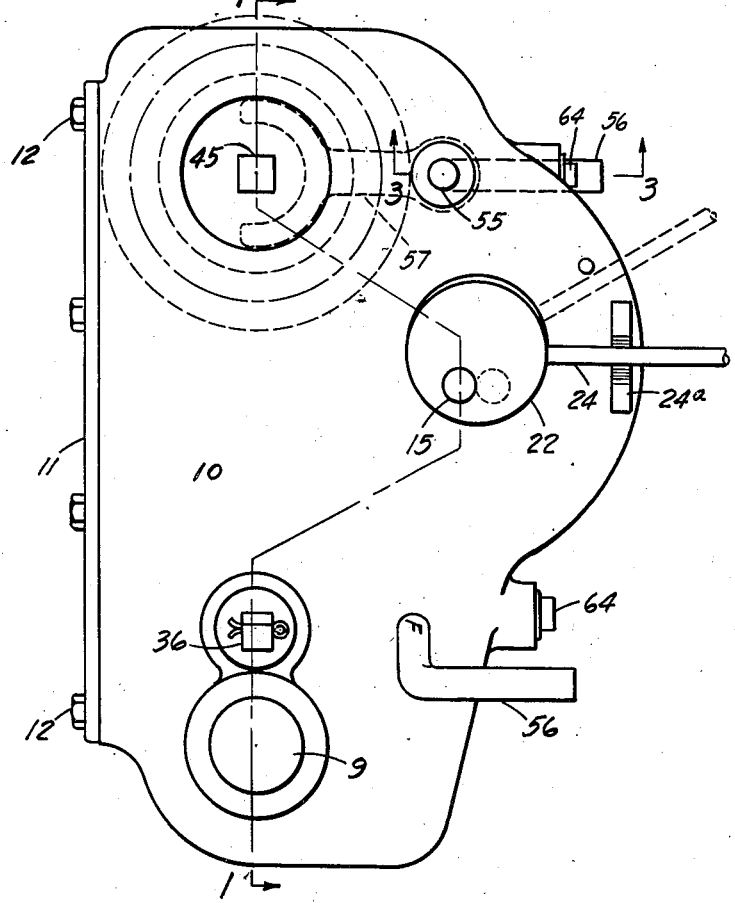
Fig. 2 is an end elevation of my complete device.

I provide flanges 22 and 23 on bearing sleeves 18 and 19 to thereby hold the shaft in its longitudinal position. An arm 24 is secured to flange 22 whereby the operator may turn shaft 15 on its bearings thus to shift the shaft upwardly and downwardly for a purpose which will hereinafter appear. In Figure 2 the shaft is indicated as being in its downward or operating position, the upward position of the shaft and the corresponding position of arm 24 being shown by dotted lines.

A spring catch 24a is provided which is adapted to yieldingly hold rod 24 in its operating position but permit it to be moved manually to its inoperative position.

I rotatably mount on shaft 15 a gear 25 having a sleeve 26 and provide a spacing sleeve 27 to thereby hold the sleeve from end movement. I mount on sleeve 26 a series of gears 30, 31, 32, 33, and 34 of various diameters. The diameters of these gears are adapted to form on their periphery a conical shaped assembly as illustrated. These gears are preferably keyed to the sleeve and held into position by means of a nut 35.

I rotatably mount an intermediate shaft 36 in the housing as illustrated by means of suitable sleeves 37 and 38. This shaft is preferably square in cross section. A gear 40 is secured to shaft 36 and is adapted to operatively engage a gear 41 which is positioned on member 9 as illustrated. Thus shaft 36 will be turned at the desired speed by member 9.

I slidably mount a gear 42 on shaft 36 having means whereby it may be shifted to any one of the gears on shaft 15 as will hereinafter appear. It will be noted that shaft 36 is in parallel relation with the peripheries of these gears thus pinion 42 may be caused to operatively engage any one of these gears.

I rotatably mount a driven shaft 45 in housing 10 by means of suitable sleeves 43 and 44 and being positioned parallel to the periphery of the gears of shaft 15. I secure a sprocket gear 46 on the protruding end of shaft 45 preferably as illustrated with which to make an operating connection to the feed shaft of the grain drill by means of a suitable chain. I may, however, elect to use gears for this purpose. Bearing sleeves 43 and 44 are held into position on shaft 45 preferably by means of washers 48 and cotter pins as at 49.

Shaft 45 is preferably square in cross section and provided with a shiftable gear 50 which is adapted to operatively engage any one of the gears on shaft 15. The shifting of this gear is accomplished similar to the shifting of gear 42 as will hereinafter appear.

It will be seen by scrutinizing Figure 1 that shaft 36 is driven by shaft 9 through gears 40 and 41 and that the cone gears are driven by gear 42 when in operating position with any one of the gears on shaft 15 and that shaft 45 is driven by any one of six selective positions of gear 50.

It will be observed that shafts 36 and 45 are each square in cross section, thus pinions 42 and 50 may be considered as being splined and slidably mounted on their respective shafts. Shaft 15 however is round in cross section forming an axis for gear 25 and sleeve 26. Eccentric bearings 18 and 19 however are keyed or pinned to the shaft so they are turned simultaneously by means of rod 24.

The speed of shaft 45 may be increased in successive stages by shifting gear 50 to any one of the cone gears and by shifting gear 42 to the various cone gears. Thus the speed of shaft 45 may be changed at will. It will be understood that the ratios may be changed by changing the size of the various gears or by providing a different number of gears with which to make up the cone assembly.

The highest ratio of speed between member 9 and shaft 45 will be established when gear 42 is in operating contact with gear 25 and gear 50 is in operating contact with gear 30. Thus a large range of speeds are available by the simple method of shifting either or both gears 42 or 50.

It will be noted that the periphery of the gears on shaft 15 when considered longitudinally presents a slightly irregular surface and for this reason, gears 42 or 50 cannot be shifted without first moving shaft 15 to the position shown by dotted lines in Figure 2.

Figure 3:
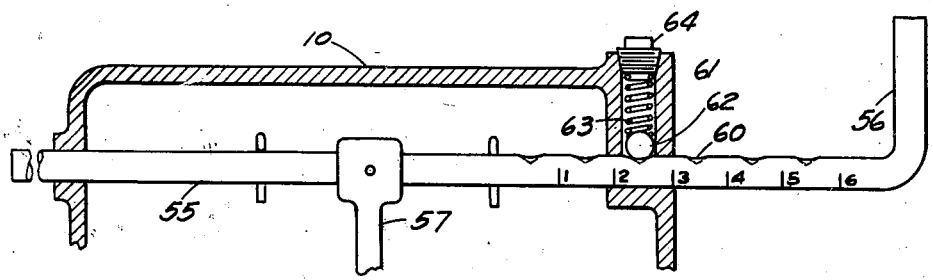
Fig. 3 is a fractional detail view of one of the gear shifting means.

In Figure 3 I illustrate the preferred means for shifting the gears 42 and 50 as already described. This means comprises a shaft 55 which is slidably secured in the housing as illustrated and having at one end a right angle portion 56 providing a convenient hand grip for the operator.

I secure a bracket 57 to shaft 55 the lower ends being forked and adapted to be loosely embraced by grooves 58 and 59 in gears 42 and 50. Thus by moving shaft 55 in one direction or another, the gears 42 and 50 will be shifted from one cone gear to another.

In order to maintain the working position of the gears when once shifted, I provide depressions 60 in shaft 55, an opening 61 in the housing which is supplied with a ball 62 and a spring 63, the spring being held into position preferably by means of a pipe plug 64. Thus the spring will force the ball into depression 60 and hold shaft 55 into its selective position. The operator, however, may by exerting sufficient force on member 56 shift shaft 55 to any desired gear position after shaft 15 has been moved out of close mesh with the shifting gears 42 and 50.

In order to make it possible for the operator to conveniently observe the position of each gear, numbers are stamped into shaft 55 so the number adjacent the housing will indicate the gear position. Thus, as illustrated in Figure 3, the number 3 will indicate that gear 50 is in operating mesh with gear 32.

Clearly a chart may be supplied indicating the gear positions necessary for various speed ratios. For example, the shaft which controls gear 42 may be stamped A, B, C, D, E, and F and the shaft which controls gear 50 may be stamped as indicated in Figure 3. Thus the letters and figures may be associated together on the chart so as to indicate the speed ratio or quantity of grain which will be sown per acre.

Thus it will be seen that I have provided a device which is easily mounted on the grain drill, that a large range of speeds are provided and that the gear ratio may be conveniently changed by the operator.

I may secure gear 41 directly to shaft 9, however in Figure 1, I have illustrated this gear as being driven by a clutch member 70 having clutch teeth which are adapted to engage teeth on the hub of gear 41, member 70 being slidably mounted and keyed or splined to shaft 9. A spring 71 is adapted to hold the clutch into mesh. I provide forked bracket 72 having a shaft 73 which extends through the wall of the housing as illustrated in Figure 1 having on its outer end an L-shaped bend 74 on which is mounted an elongated piece 75, the narrow section being in view and the member being held on member 74 by a cotter pin as at 76. By grasping member 74, the clutch may be pulled out of engagement and if it is desired to hold this clutch out of engagement, then member 75 is turned so the long side contacts the gear housing and holds the clutch permanently out of engagement.

Clearly many minor detail changes may be made without departing from the spirit and scope of the present invention as recited in the appended claims. For example, other means may be provided for shifting the gears. Shafts 36 and 45 may be round and provided with suitable keys. Shaft 9 may be relatively smaller in diameter than shown and act as a countershaft and be driven by chain or gear from the carrying axle.

Having thus shown and described my invention I claim:

1. A variable speed transmission of the class described, comprising a supporting frame having a driving shaft rotatably mounted thereon, a gear shaft mounted on said frame, a number of gears of different diameters positioned and secured together to thereby form a cone shaped unitary gear assembly, said unitary gear assembly being rotatably mounted on said gear shaft, an intermediate shaft rotatably mounted on said frame and having rigidly mounted thereon a gear having operative engagement with a gear mounted on said driving shaft, a gear spline mounted on said intermediate shaft and being adapted to engage any one of the gears on said gear shaft, a driven shaft rotatably mounted on said frame having a gear spline mounted thereon and being adapted to engage any one of the gears on said gear shaft, means whereby said gear shaft may be moved transversely to thereby cause the gears thereon to simultaneously disengage said spline mounted gears.

2. A device as recited in claim 1 including; said driving shaft gear being rotatably mounted and having a spring actuated driver clutch slidably mounted on said driving shaft and means whereby said driver clutch may be locked out of engagement with said driving shaft gear.

3. A device as recited in claim 1 including; means for shifting said spline mounted gears when out of engagement with said unitary gears comprising rods having notches and spring actuated means adapted to engage said notches to thereby hold said splined gears in fixed position while engaging any one of said unitary gears.

4. A device as recited in claim 1 including; the means for transversely shifting said gear shaft comprising eccentric bearings being secured to the shaft, one of said eccentric bearings having a lever and means to lock said shaft into position when said splined gears are in operative engagement with any one of said unitary gears.

5. A variable speed transmission of the class described, comprising a housing having a driving shaft rotatably mounted therein, a gear shaft mounted in said housing, a number of gears of different diameters positioned and secured together to thereby form a cone shaped unitary gear assembly, said unitary gear assembly being rotatably mounted on said gear shaft, an intermediate shaft rotatably mounted in said housing and having mounted thereon a gear having operative engagement with a gear secured to said driving shaft, a gear splined on said intermediate shaft and being adapted to engage any one of the gears on said unitary assembly, a driven shaft rotatably mounted in said housing having a spline mounted gear thereon, said last spline mounted gear being adapted to engage any one of the gears on said unitary gear assembly, means whereby said gear shaft may be moved transversely to thereby cause the gears thereon to simultaneously disengage said splined gears, means for shifting said splined gears when out of engagement with said unitary gears comprising rods having notches and spring actuated means adapted to engage said notches to thereby hold said splined gears in fixed position while engaging any one of said unitary gears, said rods extending through openings in the end of said housing and having marks thereon whereby the position of said splined gears may be noted from the exterior of said housing.

6. A device of the class described, comprising a frame having a gear shaft rotatably mounted thereon, a number of gears of various diameters rigidly secured together and positioned in a cone shaped formation and being rotatably mounted on said gear shaft, spaced shafts having gears splined thereon each adapted to operatively engage any one of said cone gears, one of said spline mounted gears adapted to act as a driver and the other as a driven member, said cone gears acting as a transmission therebetween, said gear shaft being mounted on eccentrics and means whereby said eccentrics may be turned to thereby move the cone gears out of engagement with said splined gears, means adapted to optionally hold said cone gears in fixed engagement with said splined gears, means for shifting either said splined gears while out of engagement with said cone gears.

KARL H. KRAUSE.